(12) United States Patent
Hayashi

(10) Patent No.: US 8,152,087 B2
(45) Date of Patent: Apr. 10, 2012

(54) HANDLE ARM MOUNTING STRUCTURE FOR FISHING REEL

(75) Inventor: Kentaro Hayashi, Osaka (JP)

(73) Assignee: Shimano Inc., Osaka (JP)

( * ) Notice: Subject to any disclaimer, the term of this patent is extended or adjusted under 35 U.S.C. 154(b) by 297 days.

(21) Appl. No.: 12/705,163

(22) Filed: Feb. 12, 2010

(65) Prior Publication Data

US 2010/0243781 A1 Sep. 30, 2010

(30) Foreign Application Priority Data

Mar. 26, 2009 (JP) ................................. 2009-075865

(51) Int. Cl.
*A01K 89/00* (2006.01)
(52) U.S. Cl. ........................... 242/282; 242/283; 74/545
(58) Field of Classification Search .................. 242/282, 242/283, 284; 74/545
See application file for complete search history.

(56) References Cited

U.S. PATENT DOCUMENTS

| | | | | |
|---|---|---|---|---|
| 2,335,752 | A * | 11/1943 | Geiger ........................... | 242/255 |
| 5,690,290 | A * | 11/1997 | Asano et al. ................... | 242/283 |
| 5,897,072 | A * | 4/1999 | Lok ............................... | 242/395 |
| 5,906,323 | A | 5/1999 | Morimoto et al. | |
| 6,286,774 | B1 | 9/2001 | Oh | |
| 6,305,627 | B1 * | 10/2001 | Stiner et al. ................... | 242/283 |
| 6,666,396 | B2 * | 12/2003 | Landwerlen .................. | 242/283 |
| 6,883,738 | B2 * | 4/2005 | Nakajima et al. ............. | 242/282 |
| 6,966,515 | B2 * | 11/2005 | Nishikawa ..................... | 242/282 |
| 7,614,577 | B2 * | 11/2009 | Ochiai et al. .................. | 242/283 |
| 2004/0200915 | A1 | 10/2004 | Nishikawa | |
| 2007/0023555 | A1 | 2/2007 | Chang | |

FOREIGN PATENT DOCUMENTS

JP 2004-236571 A 8/2004

OTHER PUBLICATIONS

The extended European Search Report of corresponding European Application No. 10003267.1 dated Jul. 13, 2010.

* cited by examiner

*Primary Examiner* — Emmanu M Marcelo
(74) *Attorney, Agent, or Firm* — Global IP Counselors, LLP

(57) ABSTRACT

A handle arm mounting structure for a fishing reel includes a fastening section and a washer member. The fastening section has a first non-circular hole configured to engage non-rotatably with a non-circular section of a handle shaft. The washer member has a circular disk-like section and an engaging protrusion and is configured to be mounted in an axial direction on the handle shaft. The circular disk-like section has a second non-circular hole that engages with the non-circular section. The engaging protrusion protrudes toward the first non-circular hole from a periphery of the second non-circular hole. The engaging protrusion has an inside surface configured to engage with the non-circular section and an outside surface having a first tapered surface that tapers toward a tip end and engages with the first non-circular hole.

20 Claims, 9 Drawing Sheets

HANDLE ARM MOUNTING STRUCTURE FOR FISHING REEL

CROSS-REFERENCE TO RELATED APPLICATIONS

This application claims priority to Japanese Patent Application No. 2009-75865 filed on Mar. 26, 2009. The entire disclosure of Japanese Patent Application No. 2009-75865 is hereby incorporated herein by reference.

BACKGROUND OF THE INVENTION

1. Field of the Invention

The present invention relates to a handle arm mounting structure for a fishing reel having a handle arm configured to be mounted with a screw-threaded member to a handle shaft having a non-circular section formed at one end.

2. Background Information

There are fishing reels, e.g., spinning reels and dual-bearing reels, in which a handle arm is fastened to a handle shaft with a screw-threaded member, such as a nut or a bolt. In a conventional handle arm mounting structure (e.g., the structure disclosed in Japanese Laid-open Patent Publication No. 2004-236571), a tip end portion of the handle shaft is machined to form a non-circular section having a cross-sectional shape including parallel line segments joined at both ends by circular arcs, and a non-circular hole configured to engage with the non-circular section of the handle shaft is formed in the handle arm. The handle arm is fastened to the handle shaft with a screw-threaded member.

In the conventional handle arm mounting structure mentioned above, the non-circular section of the handle shaft can be formed with good precision using a machining method, but it is difficult to machine the non-circular hole in a highly precise manner while avoiding a high manufacturing cost. Consequently, a gap tends to exist between the non-circular hole of the handle arm and the non-circular section of the handle shaft. Looseness (mechanical slop) of the handle arm caused by such a gap is particularly common in spinning reels, which have a more slender handle shaft than dual-bearing reels.

In view of the above, it will be apparent to those skilled in the art from this disclosure that there exists a need for an improved handle arm mounting structure for a fishing reel. This invention addresses this need in the art as well as other needs, which will become apparent to those skilled in the art from this disclosure.

SUMMARY OF THE INVENTION

One object of the present invention is to provide a handle arm mounting structure for a fishing reel that can reduce the amount of looseness of the handle arm.

A handle arm mounting structure for a fishing reel according to one aspect is a structure for mounting a handle arm to a handle shaft having a non-circular section formed at one end with a screw-threaded member. The structure includes a fastening section and a washer member. The fastening section has a first non-circular hole configured to engage non-rotatably with the non-circular section. The washer member has a circular disk-like section and at least one engaging protrusion and is configured to be mounted on the handle shaft such that it can move or be securely mounted in an axial direction relative to the handle arm. The circular disk-like section has a second non-circular hole configured to engage with the non-circular section. The engaging protrusion is arranged to protrude toward the first non-circular hole from a periphery of the second non-circular hole. The engaging protrusion has an inside surface arranged and configured to engage with the non-circular section. Further, an outside surface of the at least one engaging protrusion has a first tapered surface that is configured to taper so as to be narrower at and to narrow toward a distal tip end, and is arranged to engage with the first non-circular hole. The washer member can be a synthetic resin member or another suitable material.

With this handle arm mounting structure, when the handle arm is attached to the handle shaft, the second non-circular hole of the washer member is mounted onto the non-circular section of the handle shaft and the first non-circular hole of the handle arm is mounted onto the non-circular section of the handle shaft. When the screw-threaded member is attached, the engaging protrusion of the washer member fits into a gap between the first non-circular hole of the handle arm and the non-circular section of the handle shaft and the first tapered surface acts to press the engaging protrusion toward the non-circular section of the handle shaft. As a result, the gap between the non-circular section and the first non-circular hole is filled by the protrusion.

In this aspect, an outside surface of the engaging protrusion is configured to engage with the first non-circular hole and an inside surface is configured to engage with the non-circular section of the handle shaft. Also, a first tapered surface is formed on the outside surface. Thus, when the screw-threaded member is installed, the engaging protrusion of the washer member can enter into the gap between the non-circular section and the first non-circular hole and fill the gap. As a result, looseness of the handle arm caused by the gap can be reduced.

In a handle arm mounting structure for a fishing reel according to another aspect, the handle arm also has at least one second tapered surface that is formed on a periphery of the first non-circular hole, configured to be slanted such that the gap between the second tapered surface and the non-circular section gradually widens, and configured to engage with the first tapered surface of an engaging protrusion. With this aspect, since a second tapered surface configured to engage with the first tapered surface of the engaging protrusion is formed on the first non-circular hole, the engaging protrusion can enter the gap between the first non-circular hole and the first non-circular section of the handle shaft more readily and looseness of the handle arm and deformation of the first non-circular hole can be suppressed more reliably.

In a handle arm mounting structure for a fishing reel according to still another aspect, the non-circular section of the handle shaft has a generally elliptical transverse cross-sectional shape having two parallel first line segments and two first circular arcs joining adjacent ends of the two first line segments, and the first non-circular hole has a generally rectangular transverse cross-sectional shape having two second line segments arranged and configured to engage with the two first line segments of the non-circular section of the handle shaft.

With this aspect, a gap is readily formed between the first non-circular hole of the handle arm and the non-circular section of the handle shaft and the engaging protrusion can easily enter into the gap.

In a handle arm mounting structure for a fishing reel according to still another aspect, the second non-circular hole of the washer member has a generally elliptical transverse cross-sectional shape having two third line segments arranged and configured to engage with the two first line segments of the non-circular section of the handle shaft and two second circular arcs arranged and configured to engage with the two first circular arcs of the non-circular section of the handle shaft. Also, the engaging protrusion is formed on at least one of the portions where the two third line segments are formed. With this aspect, since the first tapered surface is formed on a linear portion, looseness of the handle arm can be suppressed in a highly precise manner.

In a handle arm mounting structure for a fishing reel according to still another aspect, the second non-circular hole of the washer member has a generally elliptical transverse cross-sectional shape having two third line segments arranged and configured to engage with the two first line segments of the non-circular section of the handle shaft and two second circular arcs arranged and configured to engage with the two first circular arcs of the non-circular section of the handle shaft. Also, the engaging protrusion(s) is formed on at least one of the second circular arcs. With this aspect, since the engaging protrusion is arranged in a gap between the generally rectangular first non-circular hole of the handle arm and the generally elliptical non-circular section of the handle shaft, the engaging protrusion can be inserted into the gap without incorporating a special shape in the first non-circular hole and/or the non-circular section in order to form a gap for the engaging protrusion.

In a handle arm mounting structure for a fishing reel according to still another aspect, the handle arm can be made of a magnesium alloy and the screw-threaded member is a bolt member that can be made of a ferrous metal. The structure further includes a spacer that can be made of an aluminum alloy and arranged between a head portion of the bolt member and the first non-circular hole. With this aspect, an aluminum spacer is arranged between a handle arm that can be made of a magnesium alloy and a screw-threaded member that can be made of a ferrous metal, such as stainless steel. A magnesium alloy corrodes easily and the ionizing tendency of the aluminum spacer enables electrolytic corrosion of the magnesium alloy handle arm to be suppressed.

In a handle arm mounting structure for a fishing reel according to still another aspect, the fishing reel is a spinning reel and the handle arm mounting structure further includes a shaft collar having a bottom section and a cylindrical section. The bottom section has an internal circumferential portion arranged on an outer circumference of the handle shaft, and the cylindrical section extends from an outer circumference of the bottom section so as to cover the handle shaft. The washer member is arranged between the fastening section and an outside face of the bottom section.

With this aspect, a washer member is arranged sandwiched between a shaft collar and the fastening section of a spinning reel. As a result, in a spinning reel, the outside circumference of the handle shaft is protected and the washer member is less likely to be exposed to the outside. Additionally, since the washer member is not likely to be exposed to the outside, it is not necessary to color the washer member and the washer member can be made of a material that is highly weather-resistant and highly durable.

In a handle arm mounting structure for a fishing reel according to still another aspect, the handle shaft has a first annular protrusion configured and arranged such that it can face opposite an inside surface of the bottom section of the shaft collar and a second annular protrusion configured and arranged such that it can contact an end face of a master gear shaft of the spinning reel.

With this aspect, since the second annular protrusion can contact the master gear shaft, it is not necessary for the shaft collar to contact the master gear shaft when the handle shaft is configured to be connected to the master gear shaft with a threaded connection (i.e., screwed into or onto the master gear shaft). Consequently, the structure of the shaft collar can be simplified. Also, since the first annular protrusion restricts axial movement of the shaft collar in an inward direction, the washer member arranged between the shaft collar and the fastening section can be moved relative to the handle arm.

In a handle arm mounting structure for a fishing reel according to still another aspect, a spring member is arranged between the first annular protrusion and an inside surface of the bottom section. With this aspect, the spring member is compressed when the screw-threaded member is tightened such that the washer member and the bottom section of the shaft collar are pinched between the first annular protrusion and the fastening section. As a result, the screw-threaded member is less likely to become loose and the gap between the shaft collar and the reel unit can be adjusted by way of the spring member.

In a handle arm mounting structure for a fishing reel according to still another aspect, an internally threaded section configured to mesh with the screw-threaded member is formed in one end face of the handle shaft. With this aspect, the handle arm can be fastened using a bolt and, thus, the screw threaded member is less likely to protrude from the fastening section.

With the handle arm mounting structure for a fishing reel as shown and described in this disclosure, the outside surface of the engaging protrusion is configured to engage with the first non-circular hole of the handle arm and the inside surface of the engaging protrusion is configured to engage with the non-circular section of the handle shaft. Additionally, a first tapered surface is formed on the outside surface of the engaging protrusion. Thus, when the screw-threaded member is installed and tightened, the engaging protrusion of the washer member can enter a gap between the non-circular section of the handle shaft and the first non-circular hole of the handle arm and fill the gap. As a result, looseness of the handle arm caused by the gap can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
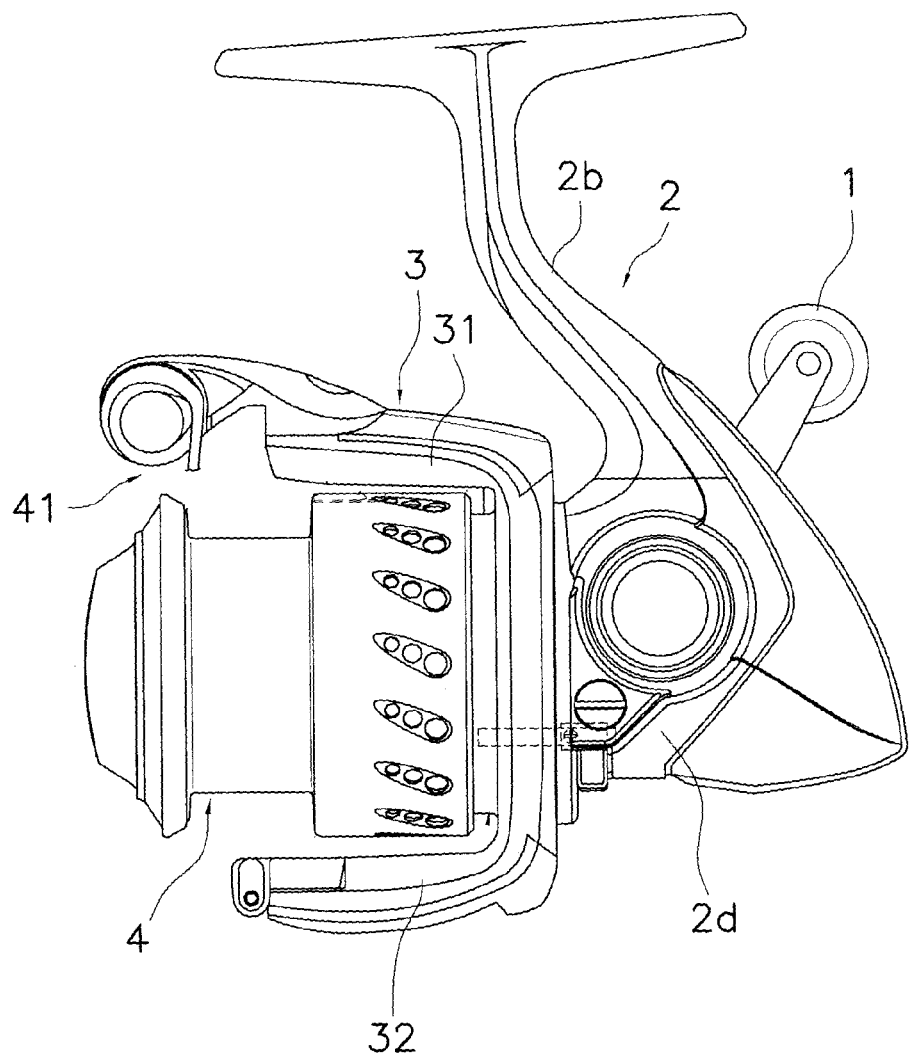
FIG. 1 is a side elevational view of a spinning reel in accordance with a first embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the first embodiment, the fishing reel is a spinning reel configured to be mounted to a fishing rod such that it winds a fishing line about an axis that is substantially parallel to an axial direction of the fishing rod. As shown in FIGS. 1 to 4, the spinning reel has a handle assembly 1, a reel unit 2, a rotor 3, a spool 4, and a handle arm mounting structure 9. The rotor 3 is rotatably supported on a frontward portion of the reel unit 2 and serves to wind the fishing line onto the spool 4. The spool 4 is configured for the fishing line to be wound onto an outer circumferential surface thereof and is arranged on a frontward portion of the rotor 3 such that it can move freely back and forth.

The reel unit 2 has a reel body 2a having an opening 2c in a left side portion of the reel body 2a, a T-shaped rod attachment leg 2b formed integrally with the reel body 2a and configured to extend from the reel body 2a diagonally upward and frontward, and a lid member 2d for covering the opening 2c of the reel body 2a. The reel body 2a has an internal space in which are provided a rotor driving mechanism 5 and an oscillating mechanism 6. The rotor driving mechanism 5 rotates the rotor 3 in conjunction with rotation of the handle assembly 1. The oscillating mechanism 6 moves the spool 4 back and forth to wind uniformly the fishing line around the spool 4.

Figure 2:
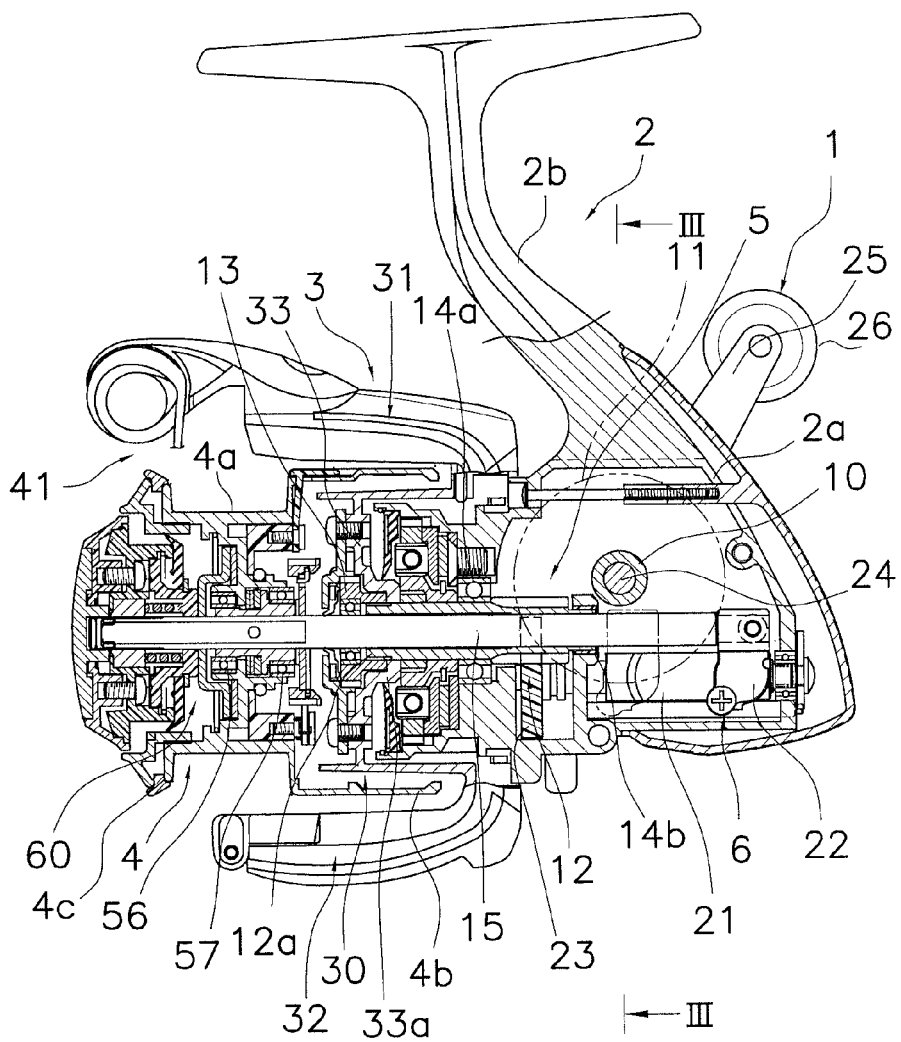
FIG. 2 is a vertical cross-sectional view of the same.

A cylindrical boss section 17a is formed on a right side face of the reel body 2a. The boss section 17a is configured to extend outward with respect to the reel body 2a in order to house a bearing 16a that supports a right end of a master gear shaft 10. A boss section 17b is formed on the lid member 2d. The shape of the boss section 17b is substantially symmetrical to the boss section 17a about a line of symmetry. The boss section 17b is configured to extend outward with respect to the lid member 2d in order to house a bearing 16b that supports a left end of the master gear shaft 10. The boss section on the side where the handle assembly 1 is not mounted (i.e., the left-hand boss section 17b when the handle assembly 1 is mounted on the right side as shown in FIG. 2) is covered with a cap member 19. The cap member 19 is a member having the form of a bottomed cylinder. The outside of the cap member 19 has the shape of a truncated cone. The cap member 19 has an externally threaded section 19a formed on an external circumferential surface thereof, and the externally threaded section 19a is configured to mesh with an internally threaded section 17c formed inside the boss section 17a or an internally threaded section 17d formed inside the boss section 17b. The cap member 19 is fastened to either the boss section 17a or the boss section 17b by means of these threaded sections.

Constituent Features of the Handle Assembly

Figure 3:
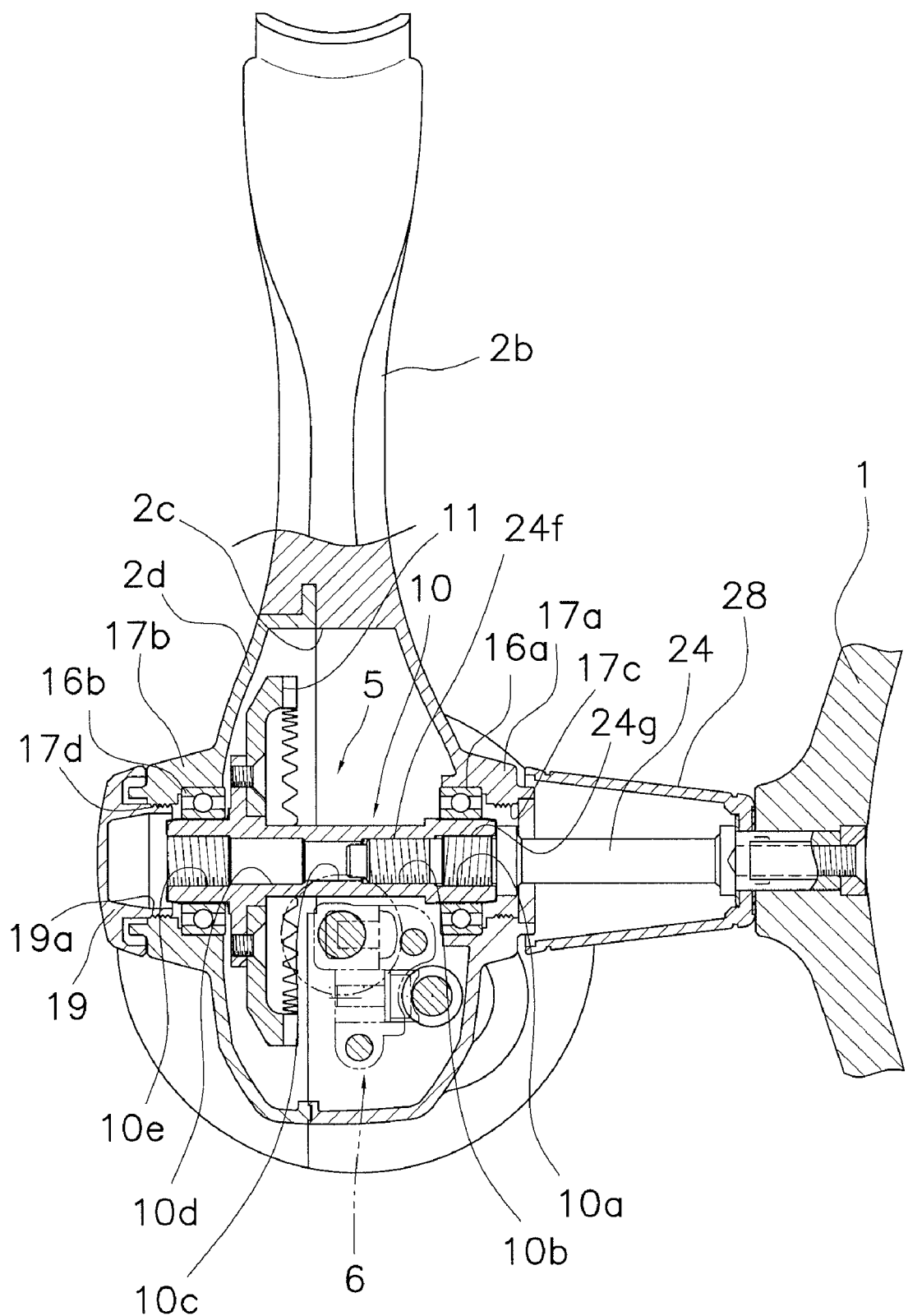
FIG. 3 is a cross-sectional view taken along the section line of FIG. 2.
Figure 4:
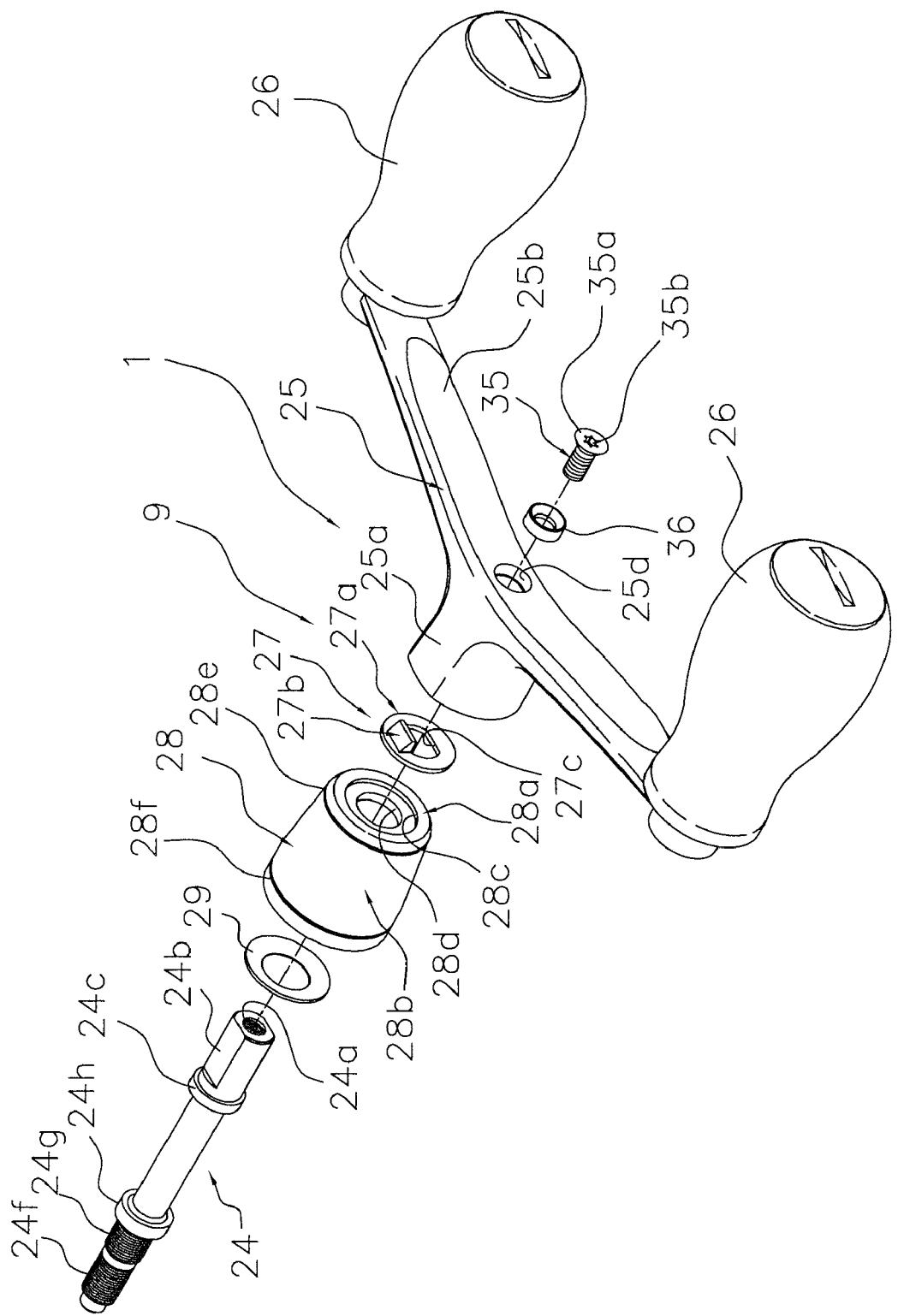
FIG. 4 is an exploded perspective view of a handle assembly of the spinning reel.

As shown in FIG. 2, the handle assembly 1 is configured to be detachably attached to the master gear shaft 10 (which is provided on a master gear 11) with a screw threaded connection. The handle assembly 1 can be mounted on either end of the master gear shaft 10 in accordance with an angler's preference and fishing method. In FIGS. 1 to 3, the handle assembly 1 is mounted on the right side when the reel body 2 is viewed from the rear, but it is also possible to mounted the handle assembly 1 on the left side. As shown in FIG. 4, the handle assembly 1 includes a handle shaft 24 having a base end configured to connect to the master gear shaft 10 with a screw threaded connection, a handle arm 25 configured to be fastened to a tip end of the handle shaft 24, and handle grips 26 rotatably attached to both ends of the handle arm 25.

Figure 5:
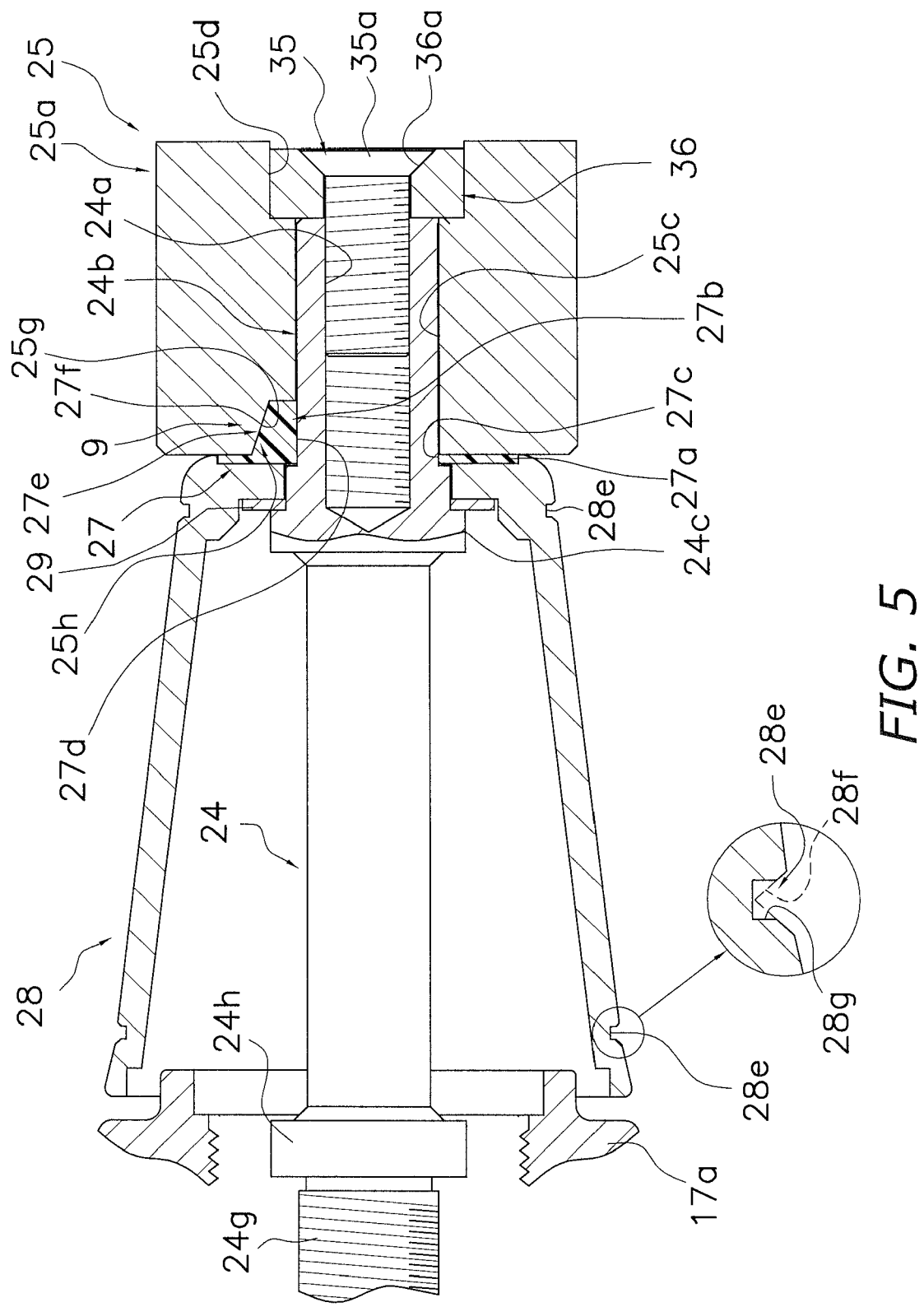
FIG. 5 is a cross-sectional view showing parts of the handle assembly.
Figure 6:
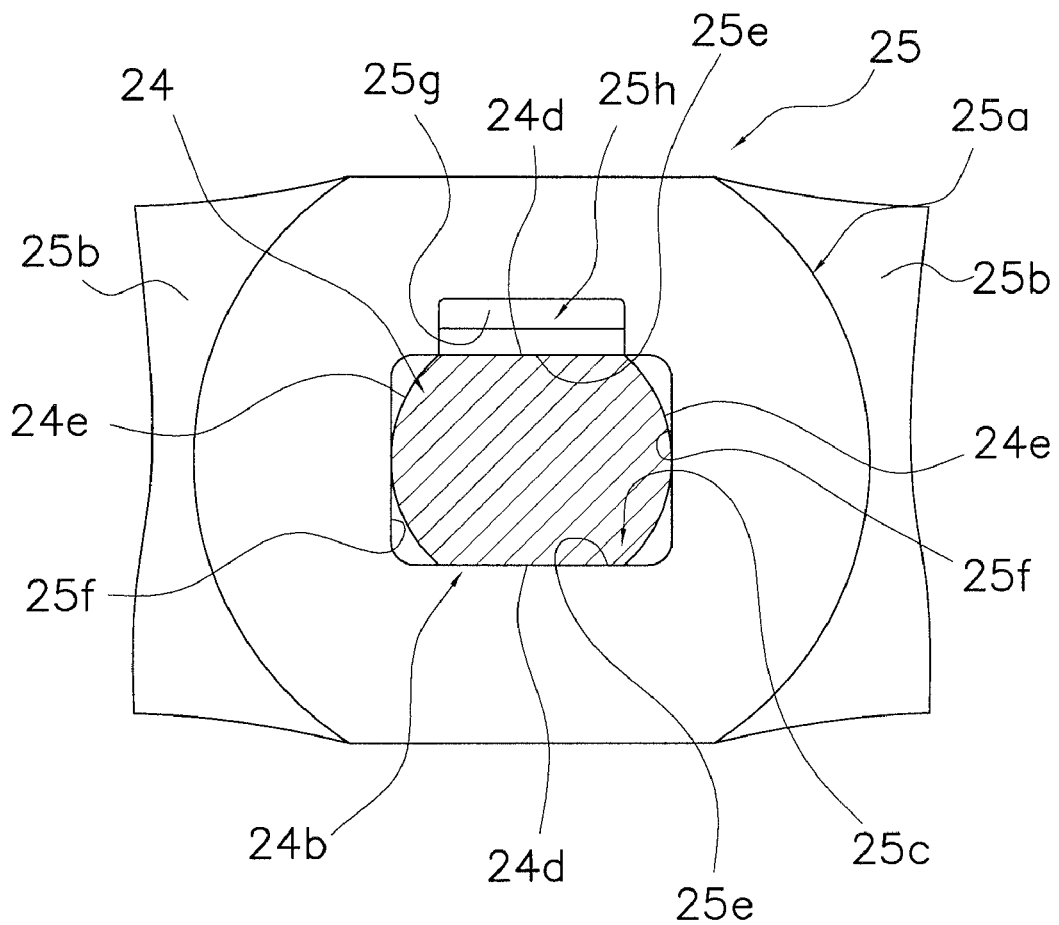
FIG. 6 is a frontal view showing a fastening section of a handle arm of the handle assembly.

The handle shaft 24 is a shaft member can be made of, for example, a stainless steel or other ferrous metal. As shown in FIGS. 4 and 5, an internally threaded section 24a for fastening the handle arm 25 is formed in an end opposite the base end of the handle shaft 24. A non-circular section 24b and a first annular protrusion 24c are formed adjacent to each other on an external circumferential portion of the end opposite the base end of the handle shaft 24. As shown in FIG. 6, in a transverse cross-sectional view, the non-circular section 24b has a generally elliptical cross-sectional shape having two parallel first line segments 24d joined at both ends by two first circular arcs 24e.

As shown in FIGS. 4 and 5, a first externally threaded section 24f and a second externally threaded section 24g configured to screw into the master gear shaft 10 are provided on the base end of the handle shaft 24. A second annular protrusion 24h is provided adjacent to the second externally threaded section 24g. The first externally threaded section 24f is, for example, a right-handed thread used when the handle assembly 1 is fastened to the right side of the reel unit 2. The second externally threaded section 24g is, for example, a left-handed thread used when the handle assembly 1 is fastened to the left side of the reel unit 2. The second annular protrusion 24h is configured and arranged such that it can contact an end face of the master gear shaft 10 when the handle assembly 1 is fastened to the reel unit 2. The second annular protrusion 24h is arranged spaced apart from the first annular protrusion 24c, and the portion of the handle shaft 24 between the first annular protrusion 24c and the second annular protrusion 24h is smaller in diameter than those of other portions of the handle shaft 24. It should be noted that the handedness of the threaded sections and the parts to which they mesh can be reversed.

The handle arm 25 is fastened to the handle shaft 24 with a fastening bolt 35 (example of a screw-threaded member) installed into the internally threaded section 24a of the handle shaft 24. The fastening bolt 35 can be made of, for example, a stainless steel or other ferrous metal. The fastening bolt 35 is a flat head countersunk bolt. The head section 35a of the fastening bolt 35 has a tool engaging section 35b having a socket recess or groove configured to engage with a TORX™, a hex (Allen), a flat head, or a Phillips type driver (in this embodiment, a TORX™-type socket recess is used). A middle portion of the handle arm 25 is fastened to the handle shaft 24 and the handle arm 25 extends in two opposite directions so as to intersect a center axis of the handle shaft 24. Thus, the handle assembly 1 of this embodiment is a so-called double handle.

The handle arm 25 can be made of, for example, a magnesium alloy member. The handle arm 25 has a fastening section 25a and an arm section 25b configured to extend from the fastening section 25a in two opposite directions so as to intersect the handle shaft 24. The fastening section 25a is a generally cylindrical member. A first non-circular hole 25c and a circular hole 25d having a larger diameter than that of the first non-circular hole 25c are formed in a center portion of the fastening section 25a. The first non-circular hole 25c is contrived to engage non-rotatably with the non-circular section 24b. As shown in FIG. 6, the first non-circular hole 25c has a generally rectangular transverse cross-sectional shape having two second line segments 25e arranged and configured to engage with the two first line segments 24d and two fourth line segments 25f arranged to face toward the first circular arcs 24e. The four corners of the first non-circular hole 25c are rounded. The circular hole 25d has a larger diameter than that of the first non-circular hole 25c.

As seen in FIG. 5, a spacer 36 is arranged in the circular hole 25d in order to prevent electrolytic corrosion caused by contact between the magnesium alloy handle arm 25 and the stainless steel fastening bolt 35. The spacer 36 is arranged between the head 35a of the fastening bolt 35 and the first non-circular hole 25c. The spacer 36 is a ring-shaped member that can be made of, for example, an aluminum alloy and is positioned by a step like transition between the circular hole 25d and the first non-circular hole 25c. The spacer 36 is provided with a cone-shaped surface 36a configured to engage with the head 35a of the fastening bolt 35.

Referring now to FIGS. 4 to 6, an engaging recess 25h is formed in an inside end face of the fastening section 25a, i.e., the end face that faces toward the handle shaft 24. The engaging recess 25h has a second tapered surface 25g configured to engage with a first tapered surface 27f of an engaging protrusion 27b of a washer member 27 (described later). As shown in FIGS. 5 and 6, the engaging recess 25h is formed along the periphery of the first non-circular hole 25c in a portion corresponding to where one of the second line segments 25e is located. The second tapered surface 25g is formed on an inside surface of the engaging recess 25h and configured to slant such that a gap between the second tapered surface 25g and the portion of the non-circular section 24b corresponding to one of the first line segments 24d gradually widens toward opening in the direction away from the circular hole 25d.

The handle grips 26 are attached to opposite ends of the handle arm 25 such that they can rotate freely about an axis substantially parallel to the handle shaft 24. The handle grips are generally cylindrical members configured to be gripped with the finger tips.

Constituent Features of the Handle Arm Mounting Structure

As shown in FIGS. 4 to 7, the handle arm mounting structure 9 includes the fastening section 25a provided on the handle arm 25 and the aforementioned washer member 27. The handle arm mounting structure 9 also includes a shaft collar 28 arranged over an outside circumference of the handle shaft 24 such that it covers at least a portion of the handle shaft 24.

As explained previously, the first non-circular hole 25c formed in a center portion of the fastening section 25a is configured to engage with the non-circular section 24b.

Figure 7:
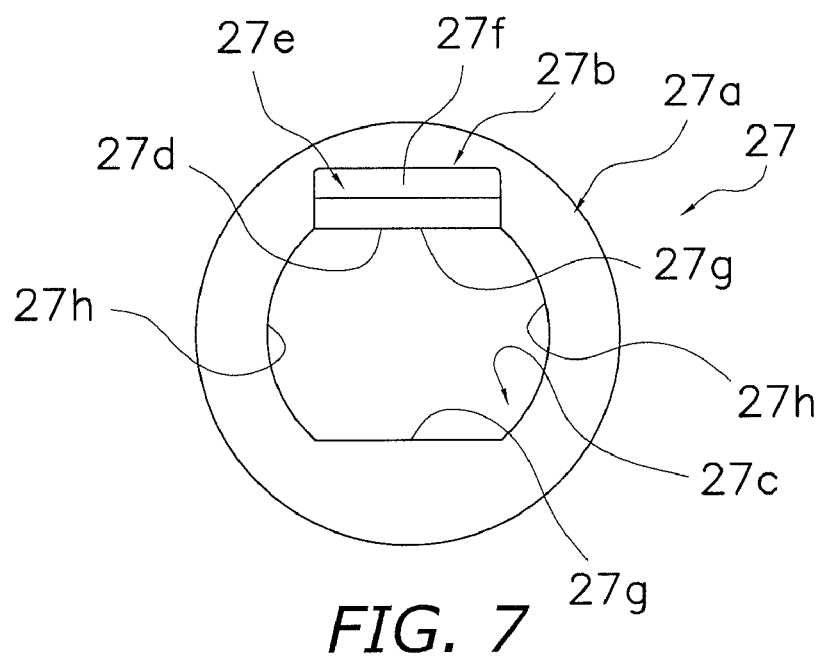
FIG. 7 is a frontal view of a washer member of the handle assembly.

The washer member 27 can be made of a synthetic resin that is comparatively hard and slides easily, e.g., polyacetal. As shown in FIGS. 4, 5, and 7, the washer member 27 has a circular disk-like section 27a and an engaging protrusion 27b. The circular disk-like section 27a has a second non-circular hole 27c configured to engage with the non-circular section 24b. The engaging protrusion 27b protrudes toward the first non-circular hole 25c from a portion of the circular disk-like section 27a along the periphery of the second non-circular hole 27c. The engaging protrusion 27b has an inside surface 27d arranged and configured to engage with the non-circular section 24b and an outside surface 27e having a first tapered surface 27f configured to engage with the first non-circular hole 25c. The washer member 27 is configured to be mounted on the handle shaft 24 such that it can move or be securely mounted in an axial direction relative to the handle arm 25. The second non-circular hole 27c has a generally elliptical transverse cross-sectional shape having two third line segments 27g arranged and configured to engage with the two first line segments 24d of the non-circular section 24b and two second circular arcs 27h arranged and configured to engage with the two first circular arcs 24e. The engaging protrusion 27b is formed on a portion where one of the two third line segments 27g is formed. In this embodiment, the inside surface 27d of the engaging protrusion 27b coincides with the third line segment 27g, but it is acceptable for the inside surface 27d to be arranged farther outward in a radial direction than the third line segment 27g.

As shown in FIGS. 4 and 5, the shaft collar 28 has a bottom section 28a and a cylindrical section 28b. The bottom section 28a is rotatably attached to the handle shaft 24, and the cylindrical section 28b is configured to extend from an outer circumference of the bottom section 28a so as to cover the handle shaft 24. A radially inward portion of the bottom section 28a is arranged on an external circumferential surface of the handle shaft 24 between the first annular protrusion 24c and the non-circular section 24b. A circular housing recess 28c configured to enclose the circular disk-like section 27a of the washer member 27 is formed in the outside face of the bottom section 28a. A through hole 28d configured to catch on the first annular protrusion 24c of the handle shaft 24 is formed in a center portion of the bottom section 28a. The cylindrical section 28b is tapered such that it widens toward the end opposite the bottom section 28a and is arranged to cover an external circumferential portion of the boss section 17a (or the boss section 17b). Two annular grooves 28e are arranged in an external circumferential surface of the cylindrical section 28b so as to be spaced apart from each other. As shown in FIG. 5, each of the annular grooves 28e is formed by first making a triangular groove 28f (indicated with a broken line) using a tool having a pointed tip and then making a rectangular groove 28g using a tool having a flat tip inside the triangular groove 28f. As a result, the annular groove 28e has the rectangular groove 28g and two diagonally chamfered edge portions arranged on both sides of the rectangular groove 28g. Forming the annular grooves 28e in this manner results in less cracking of the edge portions of the annular grooves 28e than if the rectangular grooves 28g were formed straight away without first forming the triangular grooves 28f.

A spring member 29 is arranged on an inside surface of the bottom section 28a of the shaft collar 28 such that the spring member 29 is pressed by the first annular protrusion 24c of the handle shaft 24. The spring member 29 is a ring-shaped member having a spring washer, a toothed washer, a belleville spring, or a wavy flat spring. The spring member 29 serves to prevent the fastening bolt 35 from turning and becoming loose. The spring member 29 also serves to adjust a gap between a tip end portion of the shaft collar 28 and the reel unit 2.

Other Constituent Features of the Spinning Reel

As shown in FIGS. 2 and 3, the rotor drive mechanism 5 has a master gear shaft 10 on which the handle assembly 1 is non-rotatably mounted, a master gear 11 having a face gear arranged to rotate together with the master gear shaft 10, and a pinion gear 12 arranged and configured to mesh with the master gear 11. Both ends of the master gear shaft 10 are rotatably supported in the reel body 2a on bearings 16a and 16b.

As shown in FIG. 3, a center portion of the master gear shaft 10 is open in an axial direction and includes the following coaxial items arranged in order as listed from one end (right end in FIG. 3) of the master gear shaft 10: a first through hole 10a, a first internally threaded section 10b, a second through hole 10c, a third through hole 10d, and a second internally threaded section 10e. The axial length of the first through hole 10a is substantially the same as the axial length of the second internally threaded section 10e. The internal diameter of the first through hole 10a is larger than the internal diameter of the second internally threaded section 10e and sized such that the first externally threaded section 24f of the handle shaft 24 can be inserted into the first through hole 10a. The first internally threaded section 10b is a right-handed thread configured to mesh with the first externally threaded section 24f of the handle shaft 24. The axial length of the first internally threaded section 10b is slightly longer than the first externally threaded section 24f. The axial length of the second through hole 10c is longer than the axial length of the first internally threaded section 10b. The second through hole 10c has the smallest internal diameter among the holes. The internal diameter of the third through hole 10d is larger than the internal diameter of the first internally threaded section 10b and sized such that the first externally threaded section 24f can be inserted into the third through hole 10d. The second internally threaded section 10e is a left-handed thread configured to mesh with the second externally threaded section 24g of the handle shaft 24.

As shown in FIG. 2, the pinion gear 12 is arranged in the reel unit 2 such that it can rotate freely about an axis substantially parallel to the axial direction of the fishing rod. A front portion 12a of the pinion gear 12 passes through a center portion of the rotor 3 and is fastened to the rotor 3 with a nut 13. An axially intermediate portion and a rearward end portion of the pinion gear 12 are rotatably supported in the reel unit 2 by means of a bearing 14a and a bearing 14b, respectively. A spool shaft 15 passes through a center portion of the pinion gear 12. The pinion gear 12 meshes with the master gear 11 and with the oscillating mechanism 6.

The oscillating mechanism 6 serves to move the spool shaft 15 and, thereby, move the spool 4 in the same direction. The spool shaft 15 is connected to a center portion of the spool 4 through a drag mechanism 60. The oscillating mechanism 6 includes a spiral shaft 21 arranged substantially directly below and parallel to the spool shaft 15, a slider 22 contrived to move back and forth along the spiral shaft 21, and an intermediate gear 23 arranged and configured to transmit rotation of the pinion gear 12 to the spiral shaft 21 at a reduced speed. The slider 22 is fastened non-rotatably to the rear end of the spool shaft 15.

The rotor 3 includes a cylindrical part 30, a first rotor arm 31, and a second rotor arm 32. The first rotor arm 31 and the second rotor arm 32 are arranged alongside the cylindrical part 30 facing opposite each other. The cylindrical part 30, the first rotor arm 31, and the second rotor arm 32 are formed as a one-piece integral unit. A front wall 33 is formed on a frontward portion of the cylindrical part 30 and a boss section 33a is formed in a middle portion of the front wall 33. A through hole configured to engage non-rotatably with the pinion gear 12 is formed in a center portion of the boss section 33a. The spool shaft 15 and the front portion 12a of the pinion gear 12 pass through this through hole. A bail arm 41 is pivotably attached to the tip ends of the first rotor arm 31 and the second rotor arm 32 of the rotor 3. The bail arm 41 serves to guide the fishing line onto the spool 4.

The spool 4 is arranged between the first rotor arm 31 and the second rotor arm 32 of the rotor 3 and mounted to the tip end of the spool shaft 15 through the drag mechanism 60. The spool 4 has a bobbin trunk section 4a configured for a fishing line to be wound onto an external circumference thereof, a skirt section 4b formed integrally on a rearward portion of the bobbin trunk section 4a, and a flange section 4c fixed to a front end of the bobbin trunk section 4a. The bobbin trunk section 4a is a straight cylindrical member having an external circumferential surface arranged parallel to the spool shaft 15. The bobbin trunk section 4a is mounted on bearings 56 and 57 such that it can rotate freely about the spool shaft 15.

Procedure for Attaching Handle Arm

Referring to FIGS. 2 to 5, when the handle arm 25 is fastened to the handle shaft 24, the spring member 29 is arranged on the axially outward side of the first annual protrusion 24c of the handle shaft 24 and then the shaft collar 28 is mounted onto the handle shaft 24. Next, the washer member 27 is installed onto the non-circular section 24b of the handle shaft 24 through the second non-circular hole 27c such that the engaging protrusion faces in an axially outward direction. The handle arm 25 is then mounted onto the handle shaft 24 by engaging the non-circular section 24b with the first non-circular hole 25c of the fastening section 25a. When the spacer 36 is arranged in the circular hole 25d of the handle arm 25 and the fastening bolt 35 is installed into the internally threaded section 24a, the engaging protrusion 27b engages with the engaging recess 25h and the first tapered surface 27f engages with the second tapered surface 25g of the engaging recess 25h. The engaging protrusion 27b is pushed radially inward such that the inside surface 27d of the engaging protrusion 27b is put into close contact with a portion of the non-circular section 24b corresponding to one of the first line segments 24d. In other words, the engaging protrusion 27b fills a gap between the non-circular section 24b and the first non-circular hole 25c. As a result, looseness of the handle arm 25 caused by the gap can be reduced.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Embodiment

While in the first embodiment the engaging protrusion 27b of the washer member 27 is provided on a portion corresponding to one of the third line segments 27g, in the second embodiment engaging protrusions 127b are provided on a portion corresponding to the second circular arcs 127h, as shown in FIGS. 8 to 11. The second embodiment will now be explained chiefly in terms of its differences with respect to the first embodiment. Parts of the second embodiment that are the same as the parts of the first embodiment are indicated with the same reference numerals and explanations thereof are omitted.

Figure 8:
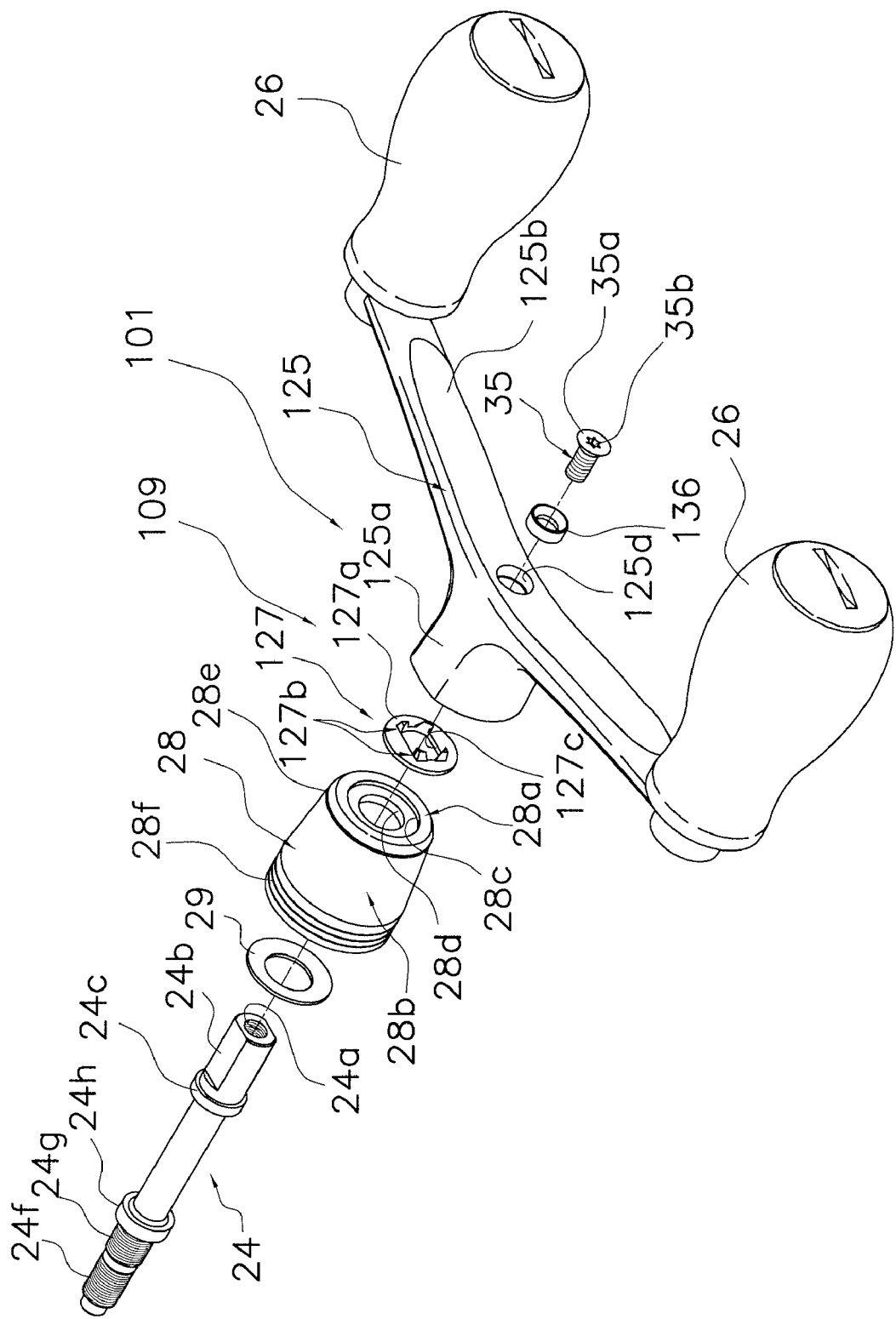
FIG. 8 is an exploded perspective view of a handle assembly according to a second embodiment corresponding to FIG. 4.

As shown in FIG. 8, the handle assembly 101 includes a handle shaft 24 having a base end configured to connect to the master gear shaft 10 with a screw threaded connection, a handle arm 125 configured to be fastened to a tip end of the handle shaft 24, and handle grips 26 rotatably attached to both ends of the handle arm 125. FIG. 8 is an exploded perspective view with the handle arm 125 rotated 90 degrees corresponding to FIG. 4.

Figure 9:
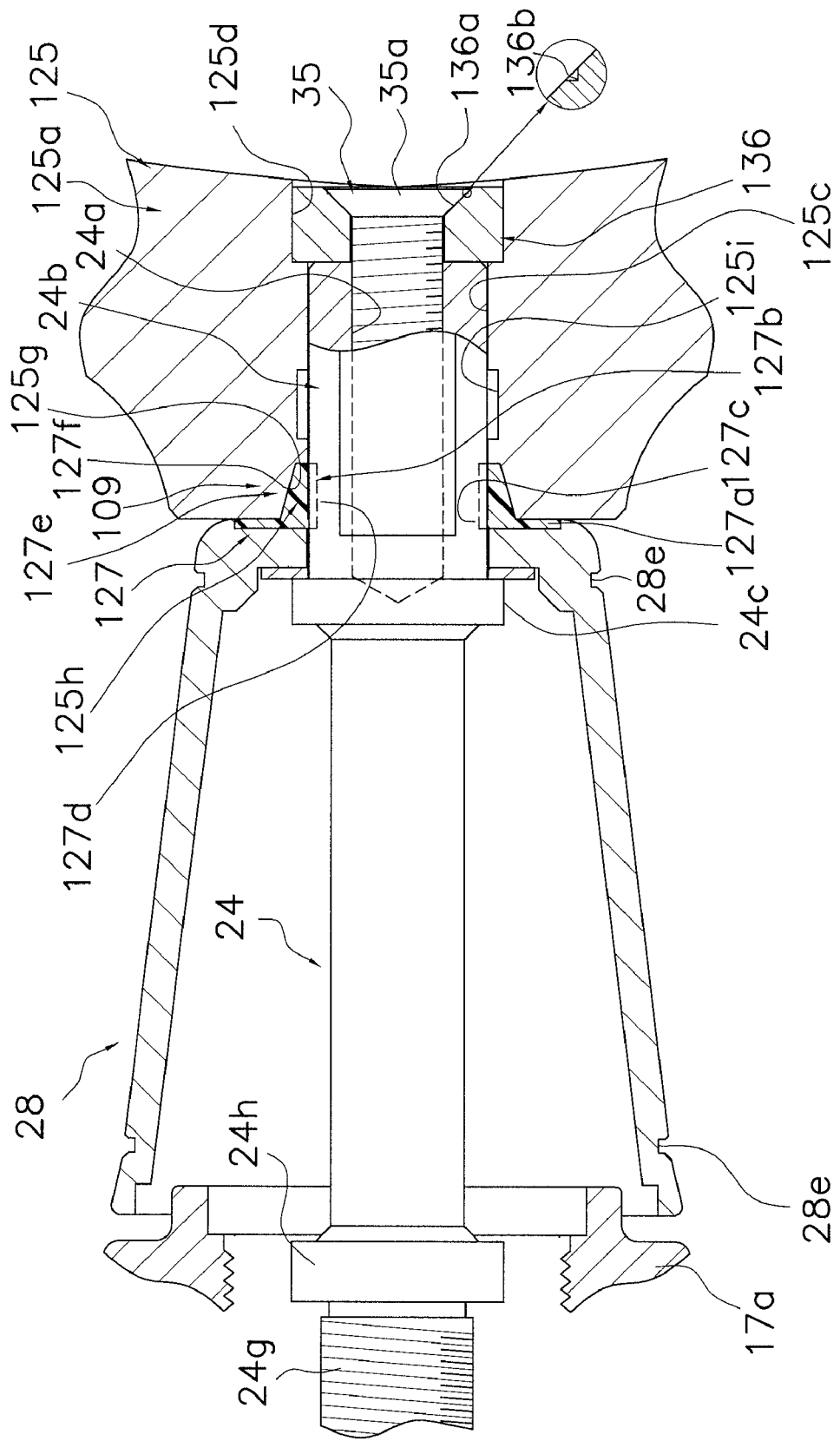
FIG. 9 is a cross-sectional view of the handle assembly of the second embodiment corresponding to FIG. 5.
Figure 10:
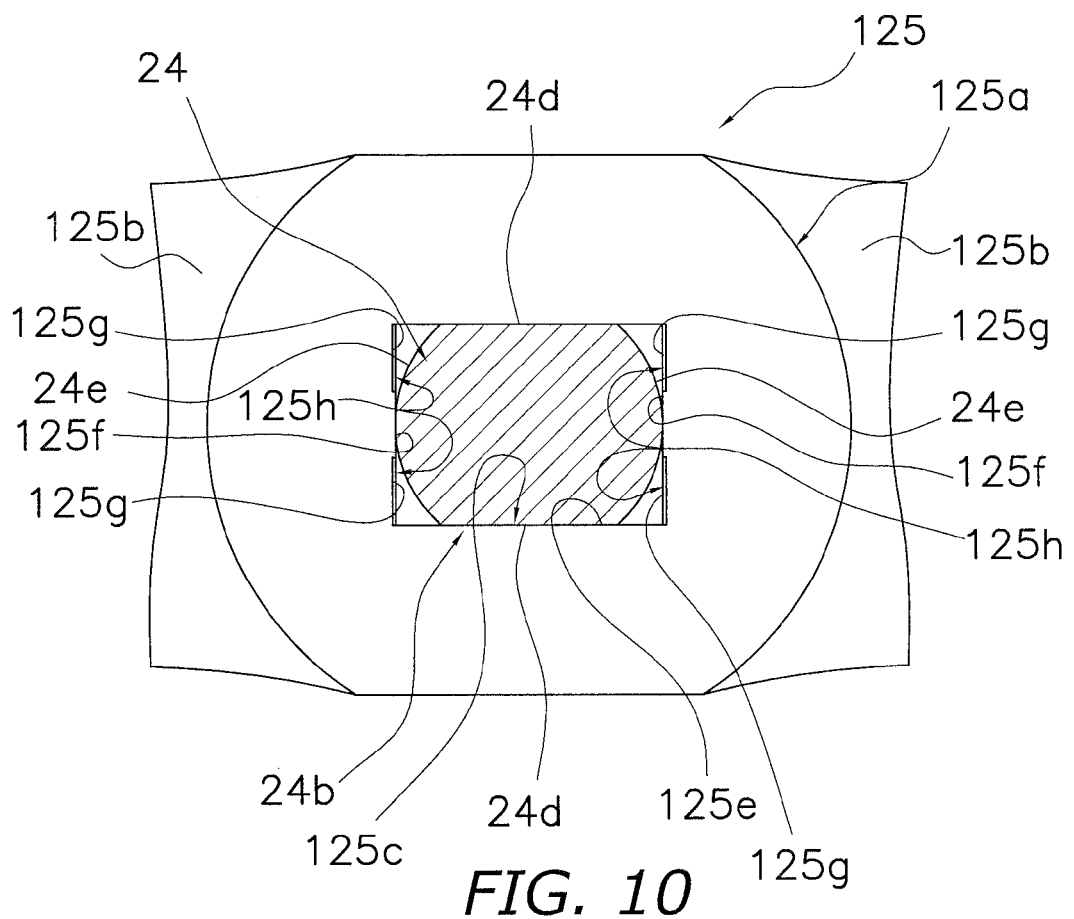
FIG. 10 is a frontal view a fastening section of the second embodiment corresponding to FIG. 6.

The handle arm 125 can be made of, for example, a magnesium alloy member. The handle arm 125 has a fastening section 125a and an arm section 125b configured to extend from the fastening section 125a in two opposite directions so as to intersect the handle shaft 24. The fastening section 125a is a generally cylindrical member. A first non-circular hole 125c and a circular hole 125d having a larger diameter than that of the first non-circular hole 125c are formed in a center portion of the fastening section 125a. The first non-circular hole 125c is contrived to engage non-rotatably with the non-circular section 24b. As shown in FIG. 9, a recessed section 125i having a larger internal diameter than that of the first non-circular hole 125c is formed in the first non-circular hole 125c. The recessed section 125i is provided for weight reduction. The first non-circular hole 125c is machined from both the inward side and the outward side of the handle arm 125. As shown in FIG. 10, the first non-circular hole 125c has a generally rectangular transverse cross-sectional shape having two second line segments 125e arranged and configured to engage with the two first line segments 24d and two fourth line segments 125f arranged to face toward the first circular arcs 24e. The four corners of the first non-circular hole 125c are not rounded. The circular hole 125d has a larger diameter than that of the first non-circular hole 125c.

As shown in FIG. 9, a spacer 136 is arranged in the circular hole 125d in order to prevent electrolytic corrosion caused by contact between the magnesium alloy handle arm 125 and the stainless steel fastening bolt 35. The spacer 136 is arranged between the head 35a of the fastening bolt 35 and the first non-circular hole 125c. The spacer 136 is a ring-shaped member and can be made of, for example, an aluminum alloy surface treated with alumite and is positioned like a step like transition between the circular hole 125d and the first non-circular hole 125c. The spacer 136 is provided with a cone-shaped surface 136a configured to engage with the head 35a of the fastening bolt 35. An annular groove 136b having a slight step-like recess is formed in the cone-shaped surface 136a. The annular groove 136b serves to prevent cracks from propagating in the alumite. More specifically, when the flat head fastening bolt 35 is tightened, cracking of the alumite on the cone-shaped surface 136a can occur due to contact with the head 35a. The cracking stops at the annular groove 136b and does not readily spread across the surface of the spacer 136.

As shown in FIG. 10, four engaging recesses 125h are formed in an inside end face of the fastening section 125a, i.e., the end face that faces toward the handle shaft 24. Each of the engaging recesses 125h has a second tapered surface 125g configured to engage with a first tapered surface 127f of an engaging protrusion 127b of a washer member 127. As shown in FIGS. 9 and 10, the engaging recesses 125h are formed along the periphery of the first non-circular hole 125c in portions corresponding to both ends of the fourth line segments 125f. Each of the second tapered surfaces 125g is formed on an inside surface of the respective engaging recess 125h and configured to slant such that a gap between the second tapered surface 125g and the portion of the non-circular section 24b corresponding to one of the first circular arcs 24e gradually widens.

As shown in FIGS. 8 to 11, the handle arm mounting structure 109 includes the fastening section 125a provided on the handle arm 125 and the aforementioned washer member 127. The handle arm mounting structure 109 also includes a shaft collar 28 arranged over an outside circumference of the handle shaft 24 such that it covers the handle shaft 24.

As explained previously, the first non-circular hole 125c formed in a center portion of the fastening section 125a is configured to engage with the non-circular section 24b.

Figure 11:
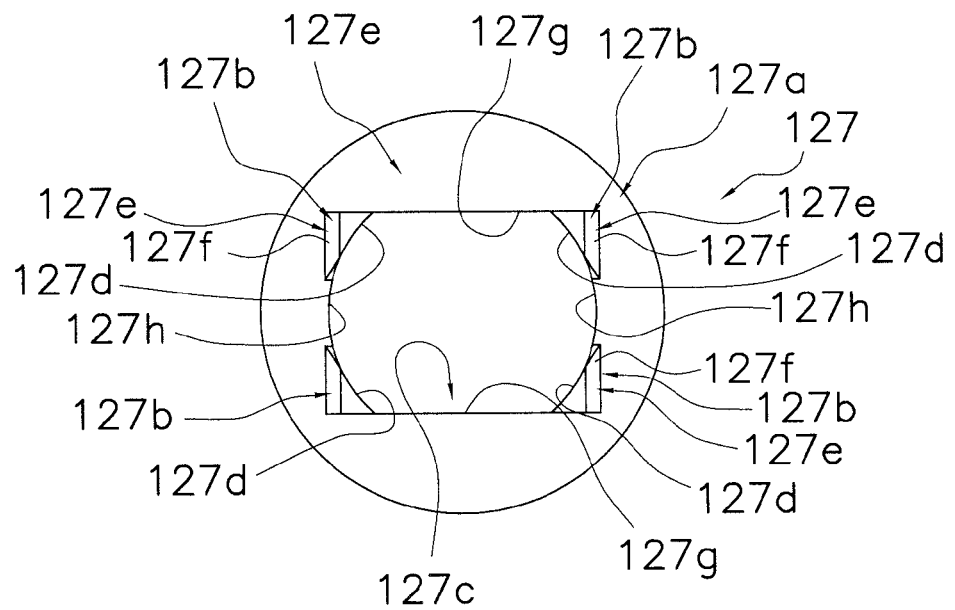
FIG. 11 is a frontal view of a washer member of the second embodiment corresponding to FIG. 7.

The washer member 127 can be made of a synthetic resin that is comparatively hard and slides easily, e.g., polyacetal. As shown in FIGS. 9 and 11, the washer member 127 has a circular disk-like section 127a and engaging protrusions 127b. The circular disk-like section 127a has a second non-circular hole 127c configured to engage with the non-circular section 24b. The engaging protrusions 127b protrude toward the first non-circular hole 125c from portions of the circular disk-like section 127 located along the periphery of the second non-circular hole 127c. Each of the engaging protrusions 127b has an inside surface 127d arranged and configured to engage with the non-circular section 24b and an outside surface 127e having a first tapered surface 127f configured to engage with the first non-circular hole 125c. The washer member 127 is configured to be mounted on the handle shaft 24 such that it can move in an axial direction relative to the handle arm 125. The second non-circular hole 127c has a generally elliptical transverse cross-sectional shape. The second non-circular hole 127c has two third line segments 127g arranged and configured to engage with the two first line segments 24d of the non-circular section 24b and two second circular arcs 127h arranged and configured to engage with the two first circular arcs 24e. The engaging protrusions are formed on portions corresponding to both ends of each of the two second circular arcs 127h. In this embodiment, the inside surfaces 127d of the engaging protrusions 127b coincide with the second circular arcs 127h, but it is acceptable for the inside surfaces 17d to be arranged farther outward in a radial direction than the second circular arcs 127h.

The second embodiment achieves basically the same operational effects as the first embodiment.

Distinctive Features (A) The handle arm mounting structure 9 for a fishing reel is a structure for mounting a handle arm 25 to a handle shaft 24 having a non-circular section 24a formed at one end with a fastening bolt 35. The structure 9 includes a fastening section 25a and a washer member 27. The fastening section 25a has a first non-circular hole 25c configured to engage non-rotatably with the non-circular section 24b. The washer member 27 is a synthetic resin member having a circular disk-like section 27a and at least one engaging protrusion 27b and configured to be mounted on the handle shaft 24 such that it can move in an axial direction relative to the handle arm 25. The circular disk-like section 27a has a second non-circular hole 27c configured to engage with the non-circular section 24b. The engaging protrusion 27b is arranged to protrude toward the first non-circular hole 25c from a periphery of the second non-circular hole 27c. The engaging protrusion 27b has an inside surface 27d arranged and configured to engage with the non-circular section 24b and an outside surface 27e having a first tapered surface 27f that is configured to taper so as to be narrower at a tip end and arranged to engage with the first non-circular hole 25c.

When the handle arm 25 is attached to the handle shaft 24, the second non-circular hole 27c of the washer member 27 is fitted onto the non-circular section 24b of the handle shaft 24 and then the first non-circular hole 25c of the handle arm 25 is fitted onto the non-circular section 24b of the handle shaft 24. Next, the fastening bolt 35 is inserted and tightened such that the engaging protrusion 27b of the washer member 27 enters into a gap between the first non-circular hole 25c and the non-circular section 24b and the first tapered surface 27f acts to press the engaging protrusion 27b toward the non-circular section 24b. As a result, the gap between the non-circular section 24b and the first non-circular hole 25c is filled by the engaging protrusion 27b.

The outside surface of the engaging protrusion 27b is configured to engage with the first non-circular hole 25c and the inside surface 27d is configured to engage with the non-circular section 24b. Also, a first tapered surface 27f is formed on the outside surface 27e. Thus, when the fastening bolt 35 tightened, the engaging protrusion 27b of the washer member 27 can enter into the gap between the non-circular section 24b and the first non-circular hole 25c and fill the gap. As a result, looseness of the handle arm 25 caused by the gap can be reduced.

(B) A second tapered surface 25g (or second tapered surface 125g) is provided on a portion of the handle arm 25 (or handle arm 125) peripheral to the first non-circular hole 25c (or first non-circular hole 125c). The second tapered surface 25g is configured and arranged to engage with the first tapered surface 27f (or first tapered surface 127f). With this configuration, since a second tapered surface 25g (or second tapered surface 125g) configured to engage with the first tapered surface 27f (or first tapered surface 127f) is formed on the first non-circular hole 25c (or first non-circular hole 125c), the engaging protrusion 27b (or 127b) can enter into the gap between the first non-circular hole and the non-circular section more easily and looseness of the handle arm 25 (or handle arm 125) and deformation of the first non-circular hole 25c (or first non-circular hole 125c) can be suppressed more reliably (C) The non-circular section 24b has a generally elliptical cross-sectional shape having two parallel first line segments 24d joined at both ends by two first circular arcs 24e, and the first non-circular hole 25c (or first non-circular hole 125c) has a generally rectangular transverse cross-sectional shape having two second line segments 25e (or second line segments 125e) arranged and configured to engage with the two first line segments 24d.

Consequently, a gap is readily formed between the first non-circular hole 25c (or first non-circular hole 125c) and the non-circular section 24b, and the engaging protrusion 27b (or engaging protrusion 127b) can fit into the gap.

(D) The second non-circular hole 27c has a generally elliptical transverse cross-sectional shape having two third line segments 27g arranged and configured to engage with the two first line segments 24d and two second circular arcs 27h arranged and configured to engage with the two first circular arcs 24e. The engaging protrusion 27b is formed on a portion where one of the two third line segments 27g is formed. Since the first tapered surface 27f is formed on a linear portion, looseness of the handle arm can be suppressed in a highly precise manner.

(E) The second non-circular hole 127c has a generally elliptical transverse cross-sectional shape having two third line segments 127g arranged and configured to engage with the two first line segments 24d and two second circular arcs 127h arranged and configured to engage with the two first circular arcs 24e. An engaging protrusion 127b is formed on at least one of the second circular arcs 127h. Thus, since the engaging protrusion 127b is arranged in a gap between the generally rectangular first non-circular hole 125c and the generally elliptical non-circular section 24b, the engaging protrusion 127b can be inserted into the gap without incorporating a special shape in the first non-circular hole 125c and/or the non-circular section 24b in order to form a gap for the engaging protrusion.

(F) The handle arm 25 (or handle arm 125) can be made of a magnesium alloy and the fastening bolt 35 can be made of a ferric metal. An aluminum alloy spacer 36 (or spacer 136) is arranged between the head 35a of the fastening bolt 35 and the first non-circular hole 25c (or first non-circular hole 125c). Thus, the aluminum spacer 36 (or spacer 136) is arranged between the magnesium alloy handle arm 25 (or handle arm 125) and the fastening bolt 35, which can be made of a stainless steel or other ferrous metal. A magnesium alloy corrodes easily and the ionizing tendency of the aluminum spacer 36 enables electrolytic corrosion of the magnesium alloy handle arm 25 (or handle arm 125) to be suppressed.

(G) The fishing reel is a spinning reel and also includes a shaft collar 28. The shaft collar 28 has a bottom section 28a and a cylindrical section 28b. An internal circumferential portion of the bottom section 28a is arranged on an outside circumference of handle shaft 24, and the cylindrical section 28b is configured to extend from an outer circumferential portion of the bottom section 28a so as to cover the handle shaft 24. The washer member 27 (or washer member 127) is arranged in a housing recess 28c formed in the collar member 28 such that the washer member 27 lies between the fastening section 25a (or fastening section 125a) an outside face of the bottom section 28a. In a spinning reel, since the washer member 27 (or washer member 127) is sandwiched between the shaft collar 28 and the fastening section 25a (or fastening section 125a), the external circumference of the handle shaft 24 is protected and the washer member 27 (or washer member 127) is less likely to be exposed to the outside. Moreover, since the washer member 27 (or washer member 127) is not likely to be exposed to the outside, it is not necessary to color the washer member 27 (or washer member 127) and the washer member 27 (or washer member 127) can be made of a material that is highly weather-resistant and highly durable.

The handle shaft 24 has a first annular protrusion 24c configured such that it can face opposite an inside surface of the bottom section 28a of the shaft collar 28 and a second annular protrusion 24h configured such that it can contact an end face of a master gear shaft 10 of the spinning reel. Since the second annular protrusion 24c can contact the master gear shaft 10, it is not necessary for the shaft collar 28 to contact the master gear shaft 10 when the handle shaft 24 is configured to be connected to the master gear shaft 10 with a threaded connection (i.e., screwed into or onto the master gear shaft). Consequently, the structure of the shaft collar 28 can be simplified. Since the first annular protrusion 24c restricts movement of the shaft collar 28 in an axially inward direction, the washer member 27 (or washer member 127) can be moved relative to the handle arm 25 (or handle arm 125) between the fastening section 25a (or fastening section 125a) and the shaft collar 28.

The spring member 29 is arranged between the first annular protrusion 24c and an inside surface of the bottom section 28a. The spring member 29 is compressed when the fastening bolt 35 is tightened such that the washer member 27 (or washer member 127) and the bottom section 28a of the shaft collar 28 are pinched between the first annular protrusion 24c and the fastening section 25a (or fastening section 125a). As a result, the fastening bolt 35 is less likely to become loose and the gap between the shaft collar 28 and the reel unit 2 can be adjusted by means of the spring member 29.

An internally threaded section 24a configured to mesh with the fastening bolt 35 is formed in one end face of the handle shaft 24. Since the handle arm 25 (or handle arm 125) can be fastened using the fastening bolt 35, the fastening bolt 35 is less likely to protrude from the fastening section 25a (or fastening section 125a).

Other Embodiments

The present invention is not limited to the embodiments explained heretofore and various changes can be made without departing from the scope of the invention as defined in the claims.

(a) Although in the previously described embodiments the fishing reel is a spinning reel having a front drag mechanism, the present invention can also be applied to a rear drag spinning reel, a closed face spinning reel, or other type of spinning reel.

The present invention can also be applied to a handle arm mounting structure for a dual-bearing reel. In a dual-bearing reel, it is acceptable for the screw threaded member to be a nut instead of a bolt. When a nut is used, it is acceptable for a washer member to be arranged between the nut and the handle arm. When the present invention is applied to a dual-bearing reel, the same effect of suppressing looseness of the handle arm can be obtained.

(b) Although in the previously described embodiments the handle assembly 1 is configured such that the handle arm 25 extends from the handle shaft 24 in two opposite radial directions, it is also acceptable for the handle assembly to be a single handle type in which a handle arm extends from the handle shaft in only one radial direction and a grip is attached to the distal end of the handle arm.

(c) Although in the previously described embodiments the handle shaft 24 has a first externally threaded section 24f and a second externally threaded section 24g having opposite thread directions, it is also acceptable to prepare two separate handle shafts each having an externally threaded section with a different thread direction and install the appropriate handle shaft of the two in accordance with which side of the reel unit the handle assembly will be mounted on. In such a case, other than the handle shaft, the same parts can be used regardless of the mounting position of the handle assembly.

(d) Although in the previously described embodiments the handle shaft 24 is screwed into master gear shaft, the present invention can also be applied to a handle assembly in which the handle shaft connects to the master gear shaft with a non-circular engagement structure.

(e) Although in the previously described embodiment the fastening section 25a (or the fastening section 125a) has a second tapered surface 25g (or section tapered surface 125g), it is acceptable not to have a second tapered section.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a fishing reel equipped with the present invention. Accordingly, these terms, as utilized to describe the present invention should be interpreted relative to a fishing reel equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A handle arm mounting structure for a fishing reel having a handle arm configured to be mounted with a screw-threaded member to a handle shaft having a non-circular section formed at one end, comprising:
   a fastening section configured to be provided on the handle arm and having a first non-circular hole configured to engage non-rotatably with the non-circular section; and
   a washer member configured to be mounted on the handle shaft in an axial direction relative to a rotation axis of the handle arm, the washer member including a circular disk-like section having
      a second non-circular hole configured to engage with the non-circular section, and
      at least one engaging protrusion protruding toward the first non-circular hole from a periphery of the second non-circular hole,
      an inside surface of the at least one engaging protrusion being arranged and configured to engage with the non-circular section, and
      an outside surface of the at least one engaging protrusion having a first tapered surface tapering to narrow toward a distal tip end and arranged to engage with the first non-circular hole.

2. The handle arm mounting structure for a fishing reel recited in claim 1, wherein
   the fastening section has at least one second tapered surface that is formed on a periphery of the first non-circular hole, is slanted such that a gap between the second tapered surface and the non-circular section gradually widens toward an opening, and engages with the first tapered surface.

3. The handle arm mounting structure for a fishing reel recited in claim 1, wherein
   the washer member is made of a synthetic resin.

4. A handle assembly for a fishing reel, comprising:
   a handle arm;
   a handle shaft having a non-circular section formed at one end;
   a screw-threaded member attaching the handle arm to the handle shaft; and
   a handle mounting structure having
      a fastening section provided on the handle arm and having a first non-circular hole non-rotatably engaging with the non-circular section, and
      a washer member mounted on the handle shaft in an axial direction relative to a rotation axis of the handle arm, the washer member including a circular disk-like section having
         a second non-circular hole engaging with the non-circular section, and
         at least one engaging protrusion protruding toward the first non-circular hole from a periphery of the second non-circular hole,
         an inside surface of the at least one engaging protrusion engaging with the non-circular section, and
         an outside surface of the at least one engaging protrusion having a first tapered surface tapering to narrow toward a distal tip end and engaging with the first non-circular hole.

5. The handle arm assembly for a fishing reel recited in claim 4, wherein
   the fastening section has at least one second tapered surface that is formed on a periphery of the first non-circular hole, is slanted such that the gap between the second tapered surface and the non-circular section gradually widens toward an opening, and engages with the first tapered surface.

6. The handle arm assembly for a fishing reel recited in claim 4, wherein
the non-circular section of the handle shaft has a generally elliptical transverse cross-sectional shape having two parallel first line segments and two first circular arcs joining adjacent ends of the two first line segments, and
the first non-circular hole has a generally rectangular transverse cross-sectional shape having two second line segments that engage with the two first line segments.

7. The handle arm assembly for a fishing reel recited in claim 6, wherein
the second non-circular hole has a generally elliptical transverse cross-sectional shape having two third line segments that engage with the two first line segments and two second circular arcs that engage with the two first circular arcs, and
the engaging protrusion is formed on at least one of the portions where the two third line segments are formed.

8. The handle arm assembly for a fishing reel recited in claim 6, wherein
the second non-circular hole has a generally elliptical transverse cross-sectional shape having two third line segments that engage with the two first line segments and two second circular arcs that engage with the two first circular arcs, and
the engaging protrusion is formed on at least one of the second circular arcs.

9. The handle arm assembly for a fishing reel recited in claim 8, wherein
the handle arm is made of a magnesium alloy,
the screw-threaded member is a bolt member made of a ferrous metal, and
the structure further includes a spacer that is made of an aluminum alloy and arranged between a head portion of the bolt member and the first non-circular hole.

10. The handle arm assembly for a fishing reel recited in claim 4, wherein
the handle arm is made of a magnesium alloy,
the screw-threaded member is a bolt member made of a ferrous metal, and
the structure further includes a spacer that is made of an aluminum alloy and arranged between a head portion of the bolt member and the first non-circular hole.

11. The handle arm assembly for a fishing reel recited in claim 4, wherein
an internally threaded section configured to mesh with the screw-threaded member is formed in one end face of the handle shaft.

12. A spinning reel, comprising:
a reel unit;
a rotor rotatably supported on a frontward portion of the reel unit;
a spool arranged on a frontward portion of the rotor; and
a handle arm assembly, the handle arm assembly having
a handle arm,
a handle shaft having a non-circular section formed at one end,
a screw-threaded member attaching the handle arm to the handle shaft, and
a handle mounting structure having
a fastening section provided on the handle arm and having a first non-circular hole non-rotatably engaging with the non-circular section, and
a washer member mounted on the handle shaft in an axial direction relative to a rotation axis of the handle arm, the washer member including a circular disk-like section having
a second non-circular engaging with the non-circular section, and
at least one engaging protrusion protruding toward the first non-circular hole from a periphery of the second non-circular hole,
an inside surface of the at least one engaging protrusion engaging with the non-circular section, and
an outside surface of the at least one engaging protrusion having a first tapered surface tapering to narrow toward a distal tip end and arranged to engage with the first non-circular hole.

13. The spinning reel recited in claim 12, wherein
the fastening section has at least one second tapered surface that is formed on a periphery of the first non-circular hole, is slanted such that the gap between the second tapered surface and the non-circular section gradually widens toward an opening, and engages with the first tapered surface.

14. The spinning reel recited in claim 12, wherein
the handle arm mounting structure further includes a shaft collar having a bottom section and a cylindrical section, the bottom section having an internal circumferential portion arranged on an outer circumference of the handle shaft and the cylindrical section extends from an outer circumference of the bottom section to cover the handle shaft, and
the washer member is arranged between the fastening section and an outside face of the bottom section.

15. The spinning reel recited in claim 14, wherein
the handle shaft has a first annular protrusion that faces opposite an inside surface of the bottom section of the shaft collar and a second annular protrusion contacts an end face of a master gear shaft of the spinning reel.

16. The spinning reel recited in claim 15, further comprising
a spring member that is arranged between the first annular protrusion and an inside surface of the bottom section.

17. The spinning reel recited in claim 12, wherein
an internally threaded section that meshes with the screw-threaded member is formed in one end face of the handle shaft.

18. The spinning reel recited in claim 12, wherein
the non-circular section of the handle shaft has a generally elliptical transverse cross-sectional shape having two parallel first line segments and two first circular arcs joining adjacent ends of the two first line segments, and
the first non-circular hole has a generally rectangular transverse cross-sectional shape having two second line segments that engage with the two first line segments.

19. The spinning reel recited in claim 18, wherein
the second non-circular hole has a generally elliptical transverse cross-sectional shape having two third line segments that engage with the two first line segments and two second circular arcs that engage with the two first circular arcs, and
the engaging protrusion is formed on at least one of the portions where the two third line segments are formed.

20. The spinning reel recited in claim 18, wherein
the second non-circular hole has a generally elliptical transverse cross-sectional shape having two third line segments that engage with the two first line segments and two second circular arcs that engage with the two first circular arcs, and
the engaging protrusion is formed on at least one of the second circular arcs.

* * * * *